United States Patent [19]

Okamura et al.

[11] 4,402,750

[45] Sep. 6, 1983

[54] BUILDING MATERIALS AND METHOD FOR MANUFACTURING SAME

[75] Inventors: Tatsuro Okamura, 4-1, Kusae, Ube-shi, Yamaguchi-ken, Japan; Hideki Irifune, Ube, Japan

[73] Assignees: Tatsuro Okamura; Yoshida Kogyo K.K., both of Tokyo, Japan

[21] Appl. No.: 327,021

[22] Filed: Dec. 3, 1981

[30] Foreign Application Priority Data

Dec. 15, 1980 [JP] Japan .................................. 55-178211

[51] Int. Cl.$^3$ ................................................ C04B 43/18
[52] U.S. Cl. ........................................ 106/85; 501/95; 501/153; 501/155
[58] Field of Search ................... 106/85; 501/95, 127, 501/153, 155

[56] References Cited

U.S. PATENT DOCUMENTS 3,835,054  9/1974  Olewinski et al. .................... 501/95

Primary Examiner—James Poer

Attorney, Agent, or Firm—Hill, Van Santen, Steadman & Simpson

[57] ABSTRACT

The invention provides a novel light-weight building material suitable for heat and sound insulation from an aluminum hydroxide sludge, which is a very noxious industrial waste material, and disintegrated scrapped paper as the base components. The sludge is first alkalized by the addition of sodium hydroxide to dissolve the gel-like aluminum hydroxide in the form of sodium aluminate and then admixed with the disintegrated scrapped paper to give a slurried mixture which is next neutralized to a weakly acidic condition by adding phosphoric acid whereby insoluble phosphates are deposited on the cellulosic fibers. The slurried mixture is further admixed with a coagulating agent to give a coagulated mass of the fibrous material with deposition of the phosphates. The coagulated mass is then separated from the liquid portion and dried to give a light-weight mass which is used as a blow-on insulating material for buildings or as a material for shaping an insulating board or slab.

8 Claims, No Drawings

BUILDING MATERIALS AND METHOD FOR MANUFACTURING SAME

BACKGROUND OF THE INVENTION

The present invention relates to a light-weight building material which can be formed into a wall board and the like shaped article or used as a blow-on insulating material in buildings as well as a method for manufacturing the same. More particularly, the invention relates to a light-weight building material of the above mentioned type manufactured very inexpensively from scrapped paper and aluminum hydroxide-containing sludge.

Needless to say, there are currently on use in the building industry a great variety of building materials depending on the requirements for the particular building and locality. The requirements for the building materials are so diversified that a material suitable in a building is not always useful in another. Several characteristics are, however, almost always important in any types of building materials among which, for example, are mechanical strength, nonflammability or flame retardancy and heat and sound insulation as well as inexpensiveness.

In relation to the inexpensiveness of the building materials, there may be obtained two-way advantages simultaneously if an industrial waste can be processed or fabricated into building materials having satisfactory characteristics in the solution of the problem caused by the burdensome waste material such as the environmental pollution and the commercial benefit obtained with the building materials produced therefrom with outstanding inexpensiveness.

Accordingly there have been made various attempts to utilize useless industrial waste materials for the production of building materials. Unfortunately there are known very few examples of success in which excellent building materials suitable for practical use are manufactured from an otherwise useless or rather harmful industrial waste as the main starting material.

Turning now to give an overview of the industries involving a serious problem of waste disposal to avoid environmental pollution, the aluminum fabrication works are typically notorious due to the difficulties in the waste disposal. As is well known, aluminum articles in recent years are used rarely as shaped by extrusion, casting or other shaping means with the metallic aluminum surface exposed but almost always used after surface finishing.

The method of surface finishing most widely undertaken in the aluminum industry is, of course, the surface anodization in which the surface of the aluminum article is electrolytically oxidized in an acidic electrolyte bath to be covered with a thin but dense layer of aluminum oxide and imparted with increased chemical and physical stability as well as beauty. A problem in the anodization treatment of aluminum articles is that a considerable amount of aluminum metal unavoidably is dissolved in the electrolyte bath and the thus dissolved aluminum finally precipitates in the form of amorphous aluminum hydroxide forming a gel-like sludge when the electrolyte solution is neutralized for sewage disposal.

The gel-like sludge usually contains large volumes, e.g. 70 to 90% by weight, of water but is hardly filtrable so that drying up of such an aluminum hydroxide sludge is practically impossible. Therefore, the only way in the art for the disposal of the aluminum hydroxide sludge is to discard it in a reclaimed land or in the ocean in the gel-like form as such.

Such a method of waste disposal is, of course, not quite acceptable even setting aside the problem of the large cost for the transportation of such a watery waste material to the reclaimed land or off to the ocean. For example, a reclaimed land filled with such a gel-like sludge is naturally weak in the yield strength of the ground resulting in a decreased utilizability of the land. Discarding of the sludge in the ocean is also not free from regulations to prevent pollution of water. Thus the waste disposal of the gel-like aluminum hydroxide sludge has been the most troublesome problem in the industry of aluminum fabrication.

SUMMARY OF THE INVENTION

Thus an object of the present invention is to provide a method for the disposal of the above described noxious aluminum hydroxide sludge in a gel-like form produced in large amounts in the aluminum-processing industry without causing any problems of environmental pollution.

Another object of the present invention is to provide a novel light-weight building material which can be used with versatility as fabricated into shaped articles such as wall boards and the like or as a blow-on insulating material on the walls, ceilings and the like of buildings from inexpensive starting materials such as the above mentioned aluminum hydroxide sludge.

The method of the present invention for manufacturing the novel light-weight building material comprises the steps of:

(a) alkalizing an aluminum hydroxide sludge by the addition of an alkali to give an alkaline solution of alkali aluminate dissolved therein, (b) admixing the alkaline solution with a disintegrated fibrous material to form a slurried mixture, (c) neutralizing the slurried mixture to neutral to weakly acidic by the addition of an acid, (d) admixing the slurried mixture with a coagulating agent to give a coagulated mass, (e) separating the coagulated mass from the liquid portion in the mixture, and (f) drying the coagulated mass.

Most advantageously, the disintegrated fibrous material admixed in the step (b) above is a disintegrated scrapped paper available with outstanding inexpensiveness. Further, the alkali to be added to the aluminum hydroxide sludge may be sodium hydroxide and the acid used for the neutralization in the step (c) above is preferably phosphoric acid so as to convert the aluminum component into insoluble aluminum phosphate which is deposited on the fibrous material. The coagulating agent used in the step (d) above may be organic or inorganic as exemplified by ionic polymers such as polyacrylamide and the like and aluminum sulfate.

DETAILED DESCRIPTION OF THE PREFERRED EMBODIMENTS

The aluminum hydroxide sludge in the gel-like form collected as an industrial waste material is first alkalized by the addition of an alkaline material. The alkaline material is not limited to a particular one but most advantageously is sodium hydroxide in view of the inexpensiveness. It is well known that aluminum hydroxide is converted to water-soluble sodium aluminate by the reaction with sodium hydroxide in an alkaline condition. The amount of the sodium hydroxide to be added to the aluminum hydroxide sludge should be carefully controlled so that the resultant solution of the sodium aluminate is not excessively alkaline. The pH of the solution of the sodium aluminate is preferably in the range from about 8 to about 9. In this weakly alkaline condition, complete dissolution of the aluminum hydroxide may not always be obtained but small amounts of undissolved aluminum hydroxide have no particular adverse effects on the subsequent steps as well as the quality of the finished building material although the amount of sodium hydroxide should naturally be determined according to the composition of the aluminum hydroxide sludge which may be widely different depending on the origin of the sludge. The concentration of the sodium aluminate in this solution is also dependent on the content of aluminum hydroxide in the starting sludge and the amount of sodium hydroxide added to the sludge.

The next step is the admixture of a disintegrated fibrous material to the above obtained solution of sodium aluminate at a pH of, preferably, 8 to 9. The fibrous material may be either inorganic or organic such as asbestos as an example of the former and cellulosic fibers as an example of the latter. The most preferred fibrous material is, however, a fluffy fibrous material obtained by disintegrating scrapped paper in view of the outstanding inexpensiveness of the material among other organic and inorganic fibrous materials.

The blending ratio of the disintegrated scrapped paper with the solution is preferably in such a range that for parts of the mixture there are from 25 to 60 parts by weight of the fibrous material per 40 to 75 parts by weight of the starting aluminum hydroxide sludge. The mixture is well stirred to form a slurried mixture in which the cellulosic fibers of the scrapped paper absorb the solution of sodium aluminate.

Next coming is the step of addition of an acid or, preferably, phosphoric acid to neutralize or rather weakly acidify the slurried mixture. The amount of the phosphoric acid should be controlled such that the resultant slurried mixture has a value of pH in the range of about 5 to 6 whereby phosphates are formed in the mixture including water-insoluble aluminum phosphate in addition to the precipitates of aluminum hydroxide.

The addition of the acid with decreased value of pH is effective to obtain full coagulation of the material exhibited by the coagulating agent to be added to the mixture in the succeeding step. When the pH of the mixture after the addition of the acid is higher than above, coagulation of the material in the succeeding step is incomplete so that the separation of the coagulated mass from the liquid portion in the step (e) can be performed with difficulty. When the amount of the acid is too large to cause undue decrease of the pH of the mixture, on the other hand, the cellulosic fibers are attacked by the acid and decomposed more or less.

The slurried mixture thus neutralized or weakly acidified as above is then admixed with a coagulating agent or flocculating agent which may be organic or inorganic as exemplified by water-soluble ionic polymers such as polyacrylamide and aluminum sulfate and the like. The object of the addition of this coagulating agent is to strengthen the bonding between the cellulosic fibers and the phosphate and hydroxide of aluminum deposited thereon in the subsequent steps of handling of the coagulated mass including drying and disintegrating. Accordingly, the amount of the coagulating agent should be limited as small as possible provided that the above mentioned object of the addition thereof is accomplished to a satisfactory extent in view of the expensiveness of the coagulating agent in comparison with the principal starting materials.

It is optional but sometimes preferable that the slurried mixture before the addition of the coagulating agent is admixed with a water-dispersible adhesive, e.g. aqueous emulsions of acrylic resins or copolymeric resins of ethylene and vinyl acetate in an amount of 5 to 10% by weight to prevent scattering of powdery materials in the finally finished dried products.

The slurried mixture thus blended with the coagulating agent is then subjected to separation in a suitable manner, for example, by filtration into liquid portion and the coagulated mass which is then dried and, if desired, subjected to disintegration. When the material is to be disintegrated, it is preferable that the material is not completely dried but contains about 30% by weight of moisture in order to facilitate disintegration. The thus obtained dried and disintegrated material is very light having a bulk density of about 0.2 $g/cm^3$ or smaller though dependent on the blending ratio of the aluminum hydroxide sludge and the disintegrated scrapped paper. The thus obtained product has sufficient flame retardancy despite the use of the inflammable scrapped paper as one of the base components by virtue of the deposition of the phosphates, e.g. aluminum phosphate and sodium phosphate, in large amounts as is understood from the fact that phosphates are powerful flame retardants. The product is highly heat-insulating and sound-insulating so that it is very useful as a material for use in buildings although high mechanical strengths cannot be expected in the material as such.

The above described inventive material is applied to buildings in two ways. The first of the applications is as a blow-on insulating material. The disintegrated material is blown on to the walls and ceilings together with a small amount of an adhesive as a binder so as to provide the surface with a layer of desired thickness formed of the material having high heat and sound insulation. Similarly, the disintegrated material is blown on to the surface of an aluminum panel or a plywood board to form a layer which is then sandwiched with another aluminum panel or plywood board to give a board of sandwich structure useful for heat and sound insulation. The adhesive used in this case is not particularly limitative but several kinds of aqueous emulsion type adhesives are preferred such as the emulsions of acrylic resins and copolymeric resins of ethylene and vinyl acetate.

Another way of the application of the inventive material is shaping of an unsupported board or slab. In this case, some measure should be taken to increase the mechanical strengths of the material. For example, the disintegrated material is admixed with an adhesive and a coagulant such as lime together with water and, after sufficient kneading, shaped into a board or slab followed by drying. The thus obtained board or slab is also excellent in heat and sound insulation.

It is also a possible way to manufacture the unsupported board or slab that the slurried mixture before the step (e) is further admixed with an additional amount of an adhesive and a coagulant such as lime to have a consistency suitable for shaping and directly shaped into the desired form of board or slab followed by drying.

As is understood from the above description, the present invention has very high practical value in that a solution is provided for the disposal of the noxious aluminum hydroxide sludge which has been beyond control in connection with the problem of environmental pollution. In addition, the inventive building material can be manufactured with low costs owing to the inexpensiveness not only of the principal components of the aluminum hydroxide sludge and the scrapped paper but also of the other auxiliary additive ingredients as well as owing to the simplicity of the manufacturing process of the product. Moreover, the light-weight building material of the invention has a high commercial value owing to the high performance of heat- and sound-insulating power as well as good workability to be versatile in the applications to any types of buildings.

What is claimed is:

1. A method for manufacturing a light-weight building material which comprises the steps of:
   (a) alkalizing a gel-type, difficultly filtrable aluminum hydroxide sludge of the type produced in the anodizing of aluminum and containing at least about 70% water by the addition of an alkali to give an alkaline solution of an alkali aluminate dissolved therein,
   (b) admixing the alkaline solution with a disintegrated fibrous material to form a slurried mixture,
   (c) neutralizing the slurried mixture to a neutral to weakly acidic condition by the addition of phosphoric acid to produce insoluble aluminum phosphate deposited on said fibrous material,
   (d) admixing the slurried mixture with a coagulating agent to give a mixture of a coagulated mass and a liquid portion,
   (e) separating the coagulated mass from the liquid portion in the mixture, and
   (f) drying the coagulated mass.

2. The method as claimed in claim 1 wherein the value of the pH of the alkaline solution of the alkali aluminate is in the range from 8 to 9.

3. The method as claimed in claim 1 wherein the alkali used in the step (a) is sodium hydroxide.

4. The method as claimed in claim 1 wherein the disintegrated fibrous material is disintegrated scrapped paper.

5. The method as claimed in claim 1 wherein the amount of the disintegrated fibrous material admixed in the step (b) is in the range from 25 to 60 parts by weight per 75 to 40 parts by weight of the aluminum hydroxide sludge used in the step (a).

6. The method as claimed in claim 1 wherein the value of the pH of the slurried mixture obtained in the step (c) is in the range from 5 to 6.

7. The method as claimed in claim 1 wherein the coagulating agent is a water-soluble ionic polymer or aluminum sulfate.

8. A light-weight building material manufactured by the process comprising the steps of:
   (a) alkalizing a gel-type difficultly filtrable aluminum hydroxide sludge of the type produced in the anodizing of aluminum and containing at least about 70% water by the addition of an alkali to give an alkaline solution of an alkali aluminate dissolved therein,
   (b) admixing the alkaline solution with a disintegrated fibrous material to form a slurried mixture,
   (c) neutralizing the slurried mixture to a neutral to weakly acidic condition by the addition of phosphoric acid, to thereby deposit insoluble aluminum phosphate on said fibrous material,
   (d) admixing the slurried mixture with a coagulating agent to give a coagulated mass,
   (e) separating the coagulated mass from the liquid portion in the mixture, and
   (f) drying the coagulated mass.

* * * * *